(12) United States Patent
Tomaiuolo

(10) Patent No.: US 6,584,643 B1
(45) Date of Patent: Jul. 1, 2003

(54) VEHICLE ENTRY AND EXIT ASSISTANCE

(76) Inventor: Theodore B. Tomaiuolo, 114 Bohemia St., Plainville, CT (US) 06062

( * ) Notice: Subject to any disclaimer, the term of this patent is extended or adjusted under 35 U.S.C. 154(b) by 0 days.

(21) Appl. No.: 10/337,511

(22) Filed: Jan. 7, 2003

Related U.S. Application Data

(63) Continuation-in-part of application No. 10/022,054, filed on Dec. 17, 2001.
(60) Provisional application No. 60/292,490, filed on May 21, 2001.

(51) Int. Cl.$^7$ .............................. B60B 7/00; A45C 13/26
(52) U.S. Cl. .......................... 16/110.1; 16/436; 16/422; 16/426; 16/429
(58) Field of Search ............................... 16/110.1, 436, 16/422, 426, 429; 280/33.992, 727; 296/1.1, 152, 63, 64, 65.01, 65.02, 65.13

(56) References Cited

U.S. PATENT DOCUMENTS

| 2,642,581 | A | | 6/1953 | Loe | |
|---|---|---|---|---|---|
| 3,469,880 | A | * | 9/1969 | Woodward | 296/1.1 |
| 4,248,441 | A | | 2/1981 | Joseph | 280/33.99 |
| 4,626,016 | A | | 12/1986 | Bergsten | 296/1 |
| 5,104,169 | A | | 4/1992 | Kopnski | 296/1.1 |
| 5,323,511 | A | | 6/1994 | Gray | 16/114 R |
| 5,913,562 | A | | 6/1999 | Mattarella et al. | 296/152 |
| 5,924,768 | A | | 7/1999 | Ramos | 297/183.6 |
| 6,129,403 | A | * | 10/2000 | Townsend | 296/65.01 |
| 6,340,189 | B1 | | 1/2002 | Pordy | 296/1.1 |

FOREIGN PATENT DOCUMENTS

| WO | WO 01/19642 | 3/2001 | B60N/3/02 |
|---|---|---|---|

* cited by examiner

Primary Examiner—Chuck Y. Mah
(74) Attorney, Agent, or Firm—The Patent Source

(57) ABSTRACT

Various assist devices that provide support for entering and exiting a vehicle through a vehicle doorframe of the type having a striker mounted thereto are disclosed. The assist devices include a retainer adapted to removably engage the striker and a support member pivotably mounted to the retainer such that the support member will apply a clamping force to the striker when the support member supports at least a portion of a user's weight. Methods of providing support for entering and exiting a vehicle through a vehicle doorframe having a striker mounted thereto are also disclosed. The methods include placing at least a portion of a retainer between the doorframe and the striker, and rotating a support member, that is pivotably attached to the retainer, relative to the retainer until the support member engages the striker to thereby clamp the striker when the user's weight is supported by the support member.

20 Claims, 10 Drawing Sheets

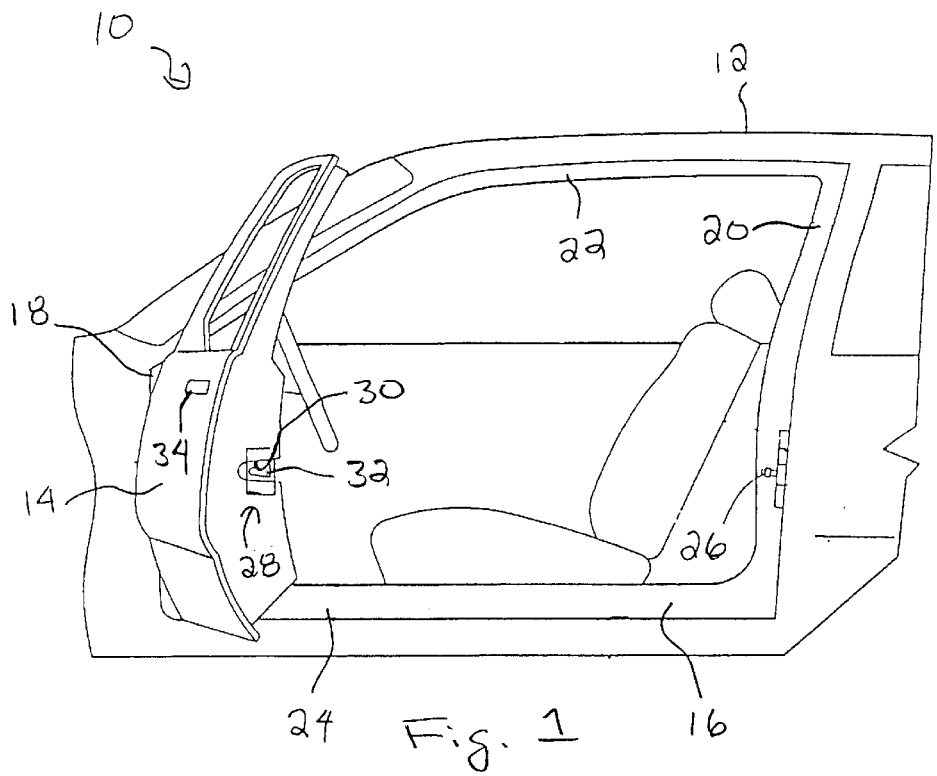
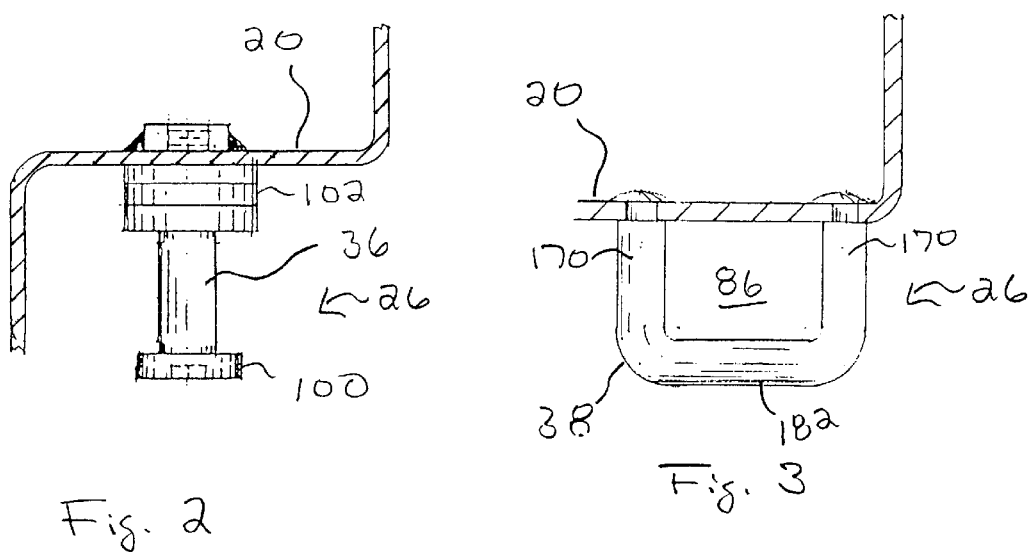

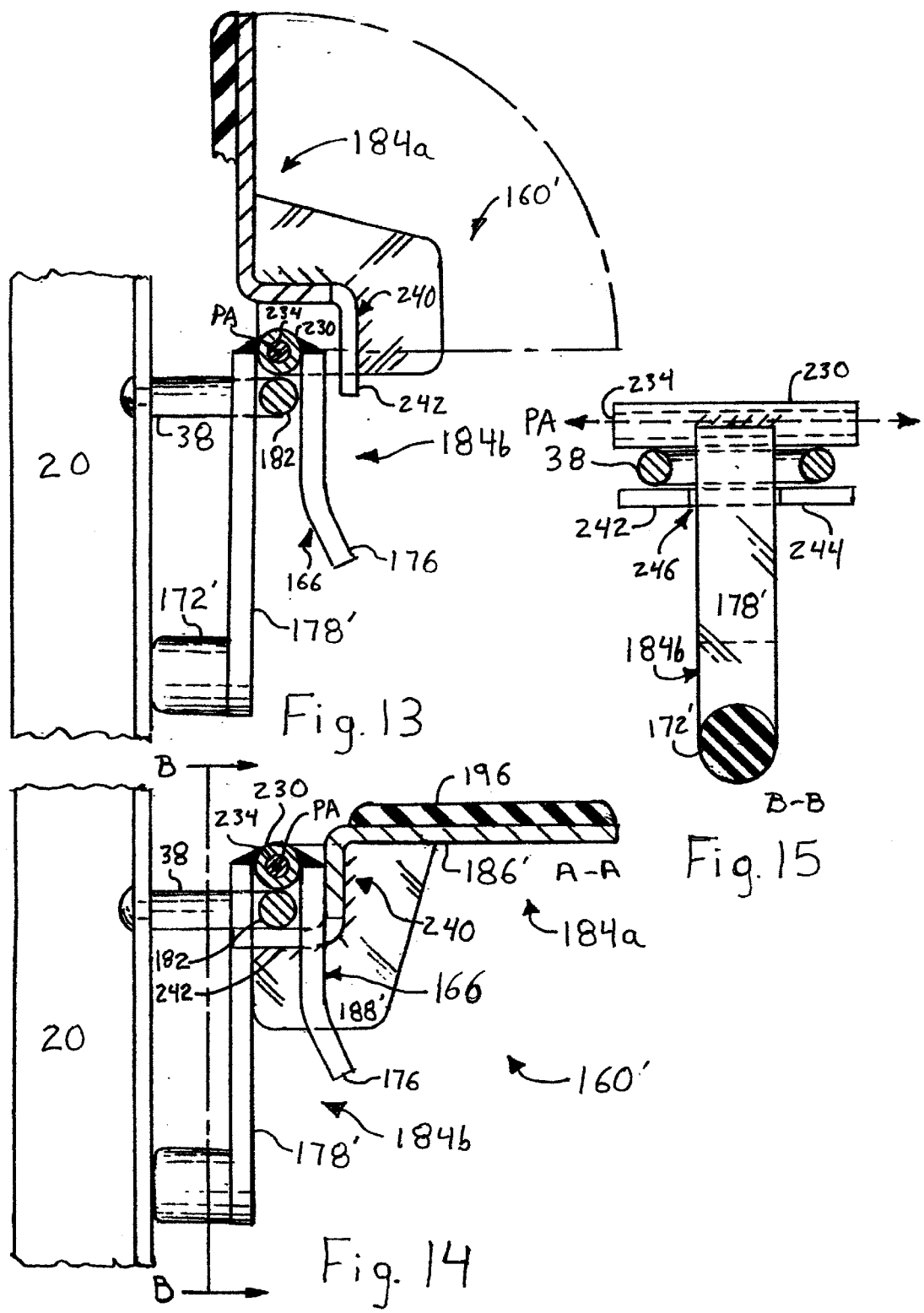

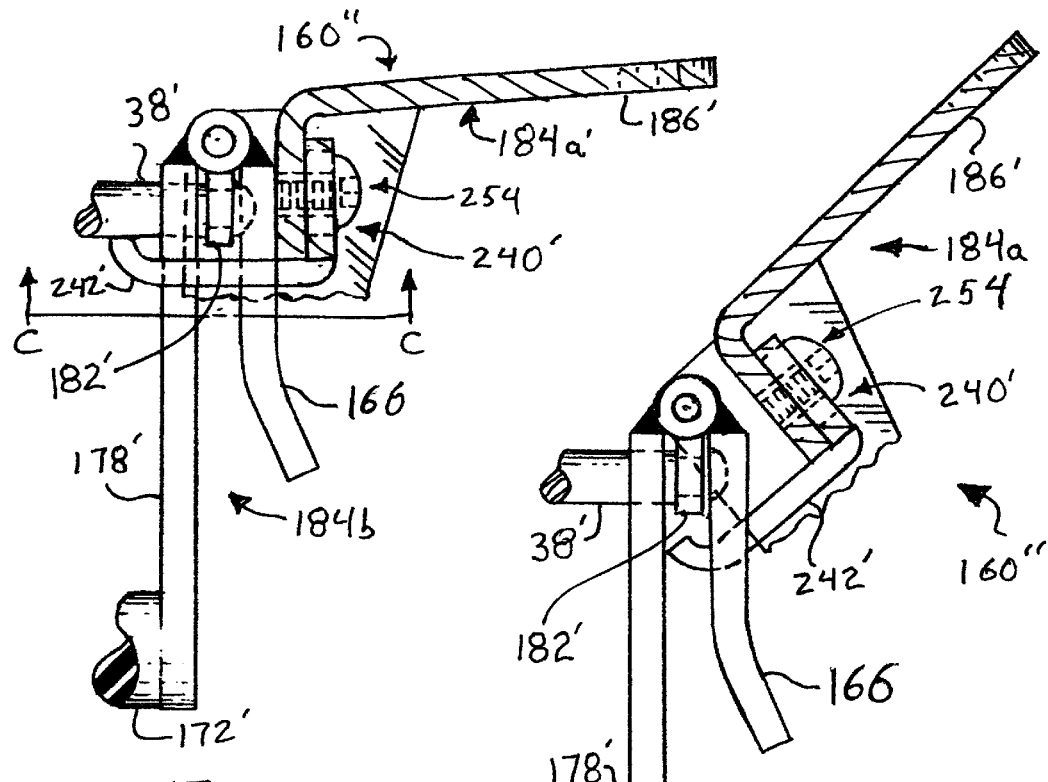
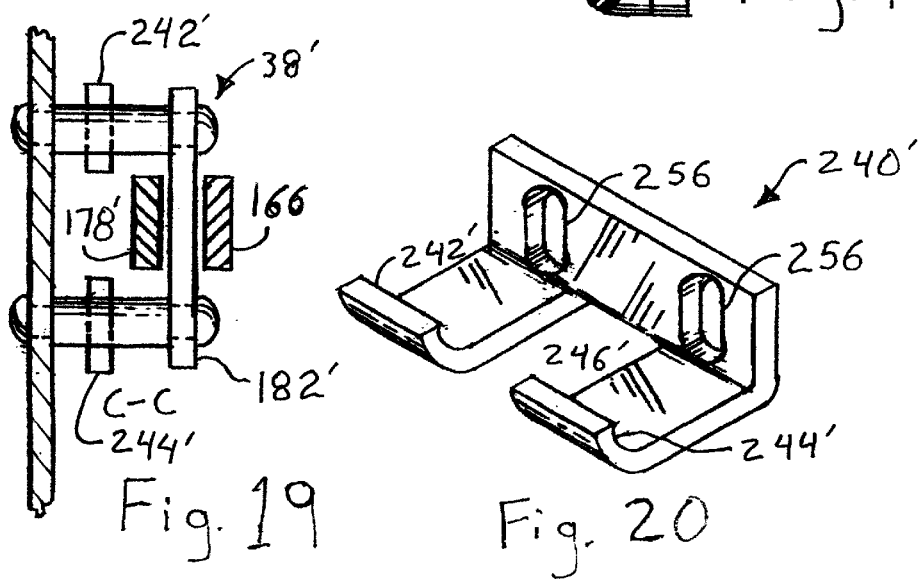

VEHICLE ENTRY AND EXIT ASSISTANCE

CROSS-REFERENCE TO RELATED APPLICATIONS

This Application is a Continuation-In-Part of co-pending U.S. patent application, Ser. No. 10/022,054 filed Dec. 17, 2001 and entitled "Assist Device For Entering And Exiting A Vehicle"; which Application is hereby incorporated by reference and which Application, in turn, claims the benefit under 35 U.S.C. 119(e) of U.S. Provisional Application 60/292,490 filed May 21, 2001; this Provisional Application is also hereby incorporated by reference.

BACKGROUND OF THE INVENTION

1. Field of the Invention

This invention relates generally to mechanical aids and methods that enhance the self-mobility of individuals, especially physically challenged individuals. More particularly, the present invention relates to devices and methods that may be employed for assisting individuals into and/or out of a vehicle. Accordingly, the general objects of the invention are to provide novel systems, methods and apparatus of such character.

2. Description of the Related Art

A number of prior art devices are found which attempt to provide a means for lifting or hoisting a patient recovering from surgery, an elderly person, a handicapped person or other incapacitated person from a sitting or prone position. Such devices are intended for use with a standard bed or chair and require access to the area in front of or beside the bed or chair. Many of these prior art devices require the explicit assistance of at least one other caregiver to operate the prior art device and to assist the individual in keeping his or her balance. Some of the prior art devices use motorized or electrically powered features which are often expensive, prone to repair, and do not allow the user to effectively exercise any portion of their physical body which may not be subject to their particular handicap or disability.

Furthermore, many of these prior art devices are bulky, heavy, and provide assistance in movement between only two fixed reference points. Such devices are particularly unsuited for use in assisting movement in or out of automobiles. First, access to seats in an automobile is generally limited to a single side. Second, there is no industry standard with respect to the position of the seats in an automobile. Consequently, there is a great degree of variation among the many brands and models of automobiles in the height of the seating surface with respect to the ground surface on which the tires rest and in the distance between the outside edge of the seat and the outside surface of the car. In addition, the topography of the land adjacent to the parked automobile will vary from parking spot to parking spot. Therefore, a device which will provide assistance between two fixed reference points will not be useable for all makes and models of automobiles and will often be unusable even if it is designed for use with a specific model of automobile.

SUMMARY OF THE INVENTION

The present invention overcomes the above-stated and other deficiencies of the related art by providing methods, systems and apparatus for supporting users entering and exiting a vehicle through a vehicle doorframe of the type having a striker mounted thereto; the invention preferably offering an optimal combination of (1) simplicity; (2) reliability; (3) economy; and (4) versatility.

In particular, the present invention provides methods, systems and apparatus for supporting individuals entering and/or exiting a vehicle through a vehicle doorframe having a striker mounted on a side portion of the doorframe, wherein the striker may engage a door latch to thereby secure the door to the doorframe in a closed position. The inventive device may include a retainer and a support member. The retainer may be adapted to removably engage the striker and may have a portion that defines a pivot axis. The support member may have a clamping portion and a support platform for supporting at least a portion of a user's weight. The support member may be pivotably mounted to the retainer for rotation about the retainer axis so that the clamping portion applies a clamping force to the striker when the user's weight is supported by the support member.

The invention is particularly helpful for a wide range of persons such as a patient recovering from knee or hip replacement surgery, an elderly person, an arthritis patient, a handicapped person, a woman in the third trimester of pregnancy or other incapacitated person when moving from a sitting or prone position to a standing position. In sum, the invention is helpful for those that are ambulatory, but, nonetheless experience difficulty when entering and/or exiting a vehicle seat.

Some of the preferred features of the invention include compatibility with a U-shaped striker by the use of retainer that is adapted for insertion through an opening formed between the doorframe and the striker. Where the retainer includes an axial bushing, it may also have first and second legs extending from the bushing generally perpendicular to the retainer axis. In such embodiments the first and second legs may be spaced from one another so one of the legs may be inserted between the doorframe the U-shaped striker. The invention may also include a support platform that may rotate about the retainer axis between clamped and unclamped positions, and a movable adjustment member that may be used to adjustably limit the clamped position of the support platform.

Another preferred feature of the invention includes a pair of guard plates disposed on respective opposite sides of the clamping portion of the support member. When the assist device is on the striker, these guard plates help to protect both the assist device and the vehicle from damage in the event that (1) an individual attempts to close the vehicle door; (2) a gust of wind blows the door closed; (3) etc.,. Additionally, the guard plates may prevent inadvertent tripping of the engagement mechanism of the door if the door is closed while the device is on the striker.

Other desirable/preferred features of the invention include the use of a non-skid material affixed to at least an upper surface of the support platform. Preferred forms of the invention may utilize an axial bushing, first and second legs extending from the bushing generally perpendicular to the retainer axis, and a resilient bumper that bears against the doorframe when the retainer member is inserted into the striker. A preferred form of the support member includes a bifurcated clamping portion with first and second members defining a gap therebetween such that the second leg of the retaining member is disposed within the gap when the support member is in a clamped position. The first and second members of the bifurcated clamp may be generally blade-like members with a curved distal end that clamps onto the striker when the user's weight is supported by the support member. Additionally, since the preferred designs utilize a user's weight to provide a clamping force, the clamping force is removed with the user's weight and the device may be easily removed from the vehicle with one hand.

The invention can also take the form of methods of providing support for entering and exiting a vehicle through a vehicle doorframe having a striker mounted on the doorframe where the striker is adapted to engage a door latch to thereby secure the door to the doorframe in a closed position. The inventive methods comprise placing at least a portion of a retainer member between the doorframe the striker, to thereby define a pivot axis that is generally parallel to the side portion of the doorframe, and rotating a support member, that is pivotably attached to the retainer member, about the pivot axis until the support member engages the striker. In this way a clamping force will be applied to the striker when the user's weight is supported by the support member. Other preferred aspects of the inventive methods include the ability to adjusting the position of the support member relative to the retainer member and the ability to use a single assist device on either the passenger-side or the driver-side of a vehicle.

Naturally, the above-described methods of the invention are particularly well adapted for use with the above-described apparatus of the invention. Similarly, the apparatus of the invention are well suited to perform the inventive methods described above.

Numerous other advantages and features of the present invention will become apparent to those of ordinary skill in the art from the following detailed description of the preferred embodiments, from the claims and from the accompanying drawings.

Accordingly, it is one object of the invention to provide methods and apparatus for assisting individuals exiting and/or entering a vehicle.

Another object of the invention is to provide a device that allows a physically challenged individual to maintain balance when moving entering or exiting a vehicle thereby decreasing the possibility of falling and increasing psychological confidence in the process.

A further object of the invention is to provide a lightweight, durable, portable device for supporting users when entering and/or exiting a vehicle through a vehicle doorframe of the type having a striker mounted thereto wherein a clamping force is applied to the striker when the support member supports at least a portion of a user's weight.

BRIEF DESCRIPTION OF THE DRAWINGS

The present invention may be better understood and its numerous objects and advantages will become apparent to those skilled in the art by reference to the accompanying drawings in which:

FIG. 1 is a partial side elevation view of a typical automobile;

FIG. 2 is a cross-sectional view through the side of the doorframe of FIG. 1, illustrating a striker stud;

FIG. 3 is a cross-sectional view through the side of the doorframe of FIG. 1, illustrating a U-shaped striker member;

FIGS. 13 and 14 are partial cross-sectional side elevation views of the embodiment of FIG. 12 shown in respective unclamped and clamped positions, the cross-section being taken at line A—A of FIG. 12;

FIG. 15 is a partial cross-sectional view of the embodiment of FIGS. 12 through 14, the cross-section being taken at the line B—B of FIG. 14;

FIGS. 17 and 18 are partial cross-sectional side elevation views of another embodiment of the invention with a position-adjustment mechanism, this embodiment being shown in respective clamped and unclamped positions;

FIG. 19 is a partial cross-sectional view of the embodiment of FIG. 18, the cross-section being taken at line C—C of FIG. 18; and FIG. 20 is a perspective view of a clamping portion of the support member depicted in FIGS. 17 through 19.

DETAILED DESCRIPTION OF THE PREFERRED EMBODIMENT

Figure 4:
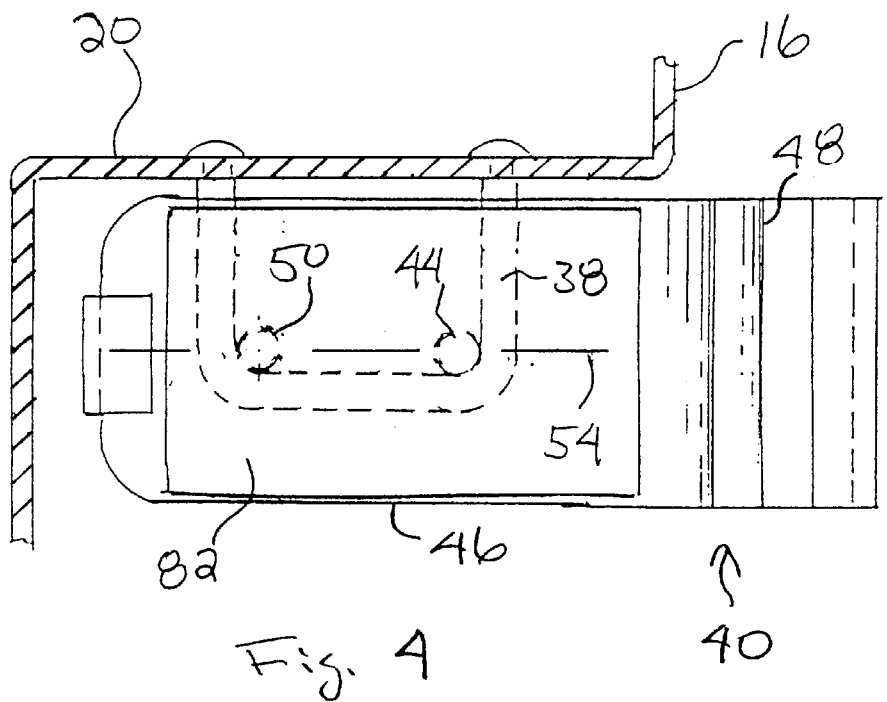
FIG. 4 is a top view, partly in phantom, of a first embodiment of an assist device in accordance with the invention mounted on a U-shaped striker member.

Referring to FIG. 1, a typical automobile 10 generally includes a vehicle body 12 formed from a plurality of panels and members that generally define the overall structural shape and appearance of the automobile. The automobile body 12 generally includes at least one closure panel portion, such as a door 14.

The door 14 is typically mounted within a doorframe 16 defined by opposed, horizontally spaced, vertically extending first and second sides 18, 20 and opposed, vertically spaced, horizontally extending top and bottom sides 22, 24. The door 14 is pivotally mounted to the first side 18 by a hinge (or hinges), or the like, and in a closed position, is retained to the second side 20 such that in a closed position the door 14 and automobile body 12 form a relatively generally planar surface.

The automobile body 12 typically includes a striker 26 mounted to the second side 20. The door 14 typically includes a latch 28 having a striker-retaining portion 30 and an engaging mechanism 32 within the striker retaining portion 30. The engaging mechanism 32 is operably connected to a door handle 34 positioned on the door 14. To close the door 14, the door 14 is directed in a closing direction, until the striker 26 is fixedly engaged within the striker retaining portion 30 by the engaging mechanism 32. To open the door 14, the door handle 34 is moved to disengage the engaging mechanism 32 from the striker 26 so that the door 14 can pivot in an open direction. With reference to FIGS. 2 and 3, the striker 26 may comprise a stud 36 or a U-shaped member 38.

Figure 6B:
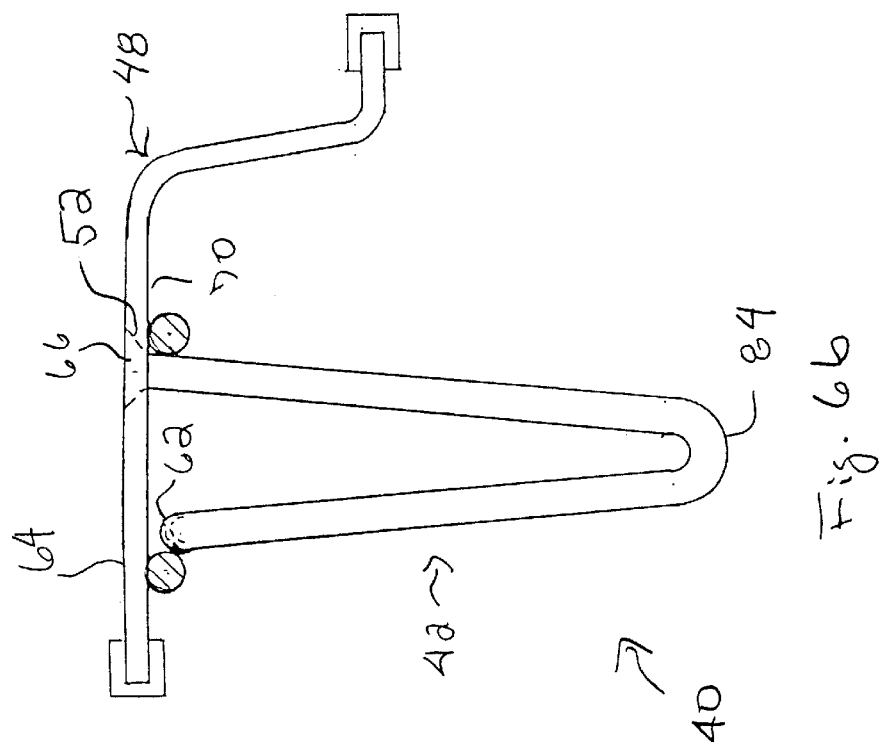
FIGS. 6a and 6b are front views of the assist device and U-shaped striker member of FIG. 4, illustrating the assist device when it is not supporting a user's weight and when it is supporting a user's weight, respectively.
Figure 6A:
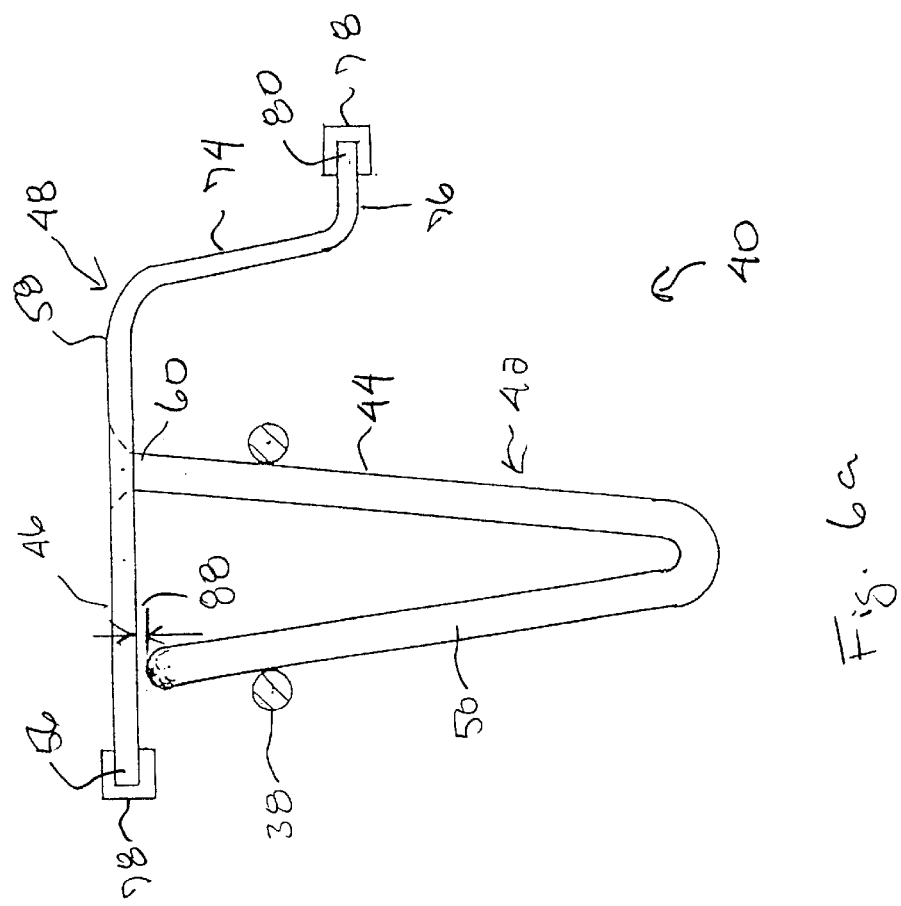

With reference to FIGS. 4, 6a and 6b, a first embodiment of the assist device 40 is employed in conjunction with a vehicle 10 having U-shaped striker members 38. The assist device 40 includes a V-shaped retainer 42 that preferably has a round cross-section. A first leg 44 of the retainer 42 is mounted to a longitudinally extending support platform segment 46 of a support member 48 and the second leg 50 is left free to move. In a preferred embodiment, an opening 52 extends through the support platform segment 46 of the support member 48 on the centerline 54 at a position intermediate the first and second ends 56, 58 of segment 46. The end portion 60 of the first leg 44 is positioned in or proximate to the lower portion of the opening 52 and the retainer 42 is oriented along the centerline 54 of the support member 48 such that the end 62 of the second leg 50 is positioned intermediate opening 52 and the first end 56 of segment 46. The end portion 60 of the first leg 44 is mounted from above the top surface 64 of the support platform segment 46 by a plug weld 66. Alternatively, the retainer may comprise an elongated plate that is welded to the lower surface 70 of the support platform segment 46. Protruding bumpers are cemented or otherwise fixed in place project from distal portions of the plate to engage the doorframe 16 and provide stability for the support member 48.

An extension segment 74 of the support member 48 extends laterally downward from the second end 58 of the support platform segment 46 to an engagement segment 76. Bumpers 78 composed of rubber or similar material are mounted to the first end 56 of the support platform segment 46 and the free end 80 of the engagement segment 76. Preferably, a non-skid coating or material 82 is affixed to at least a portion of the upper surface 64 of the support platform segment 46.

The assist device 40 is mounted in place by inserting the trough 84 of the retainer 42 through the opening 86 formed by the U-shaped striker member 38 and the doorframe 16 of the vehicle 10, as shown in FIG. 6a. The retainer 42 is configured to wedge against the interior surface of the striker member 38 to stabilize the support member 48 so that an elderly person or a disabled person may use the support platform segment 46 to assist in entering or exiting the automobile 10. As the user pushes on the upper surface 64 of the support platform segment 46 to obtain support, the retainer 42 acts like a spring with the second leg 50 flexing toward the first leg 44 until the bottom surface 70 of segment 46 rests on striker member 38. The spring tension of the compressed retainer 42 holds the device 40 in position. The first end 56 of the support platform segment 46, and the bumper 78 mounted thereon, may contact the doorframe 16 (depending on the vehicle) to provide additional support and stability.

In a preferred embodiment, the end 62 of the second leg 50 is rounded to prevent binding in the event of contact between end 62 and surface 70. Further, there is a gap 88 (preferably 0.045 inches) between end 62 and surface 70 to reduce the possibility of such contact. When the user no longer requires assistance, his or her weight is removed from the device 40 and the spring tension biases the legs 44, 50 apart, forcing the retainer 42, and support member 48 mounted thereon, upward. The retainer 42 may then be easily be withdrawn from opening 86 to remove the assist device 40 so that the vehicle door 14 may be closed.

Figure 5:
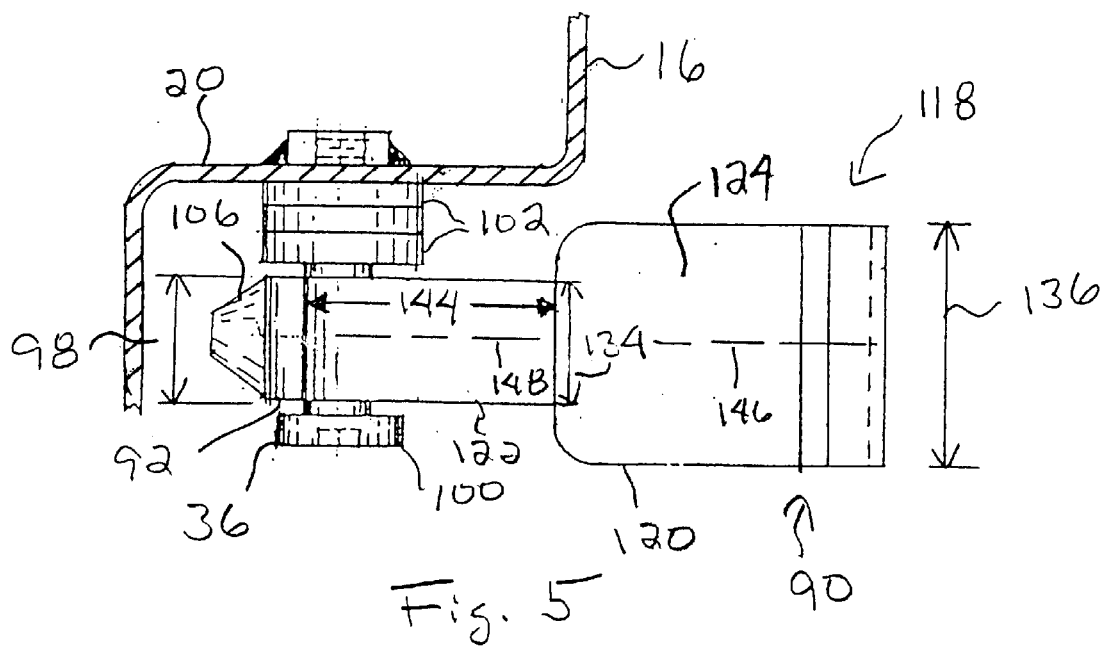
FIG. 5 is a top view of a second embodiment of an assist device in accordance with the invention mounted on a striker stud.
Figure 7A:
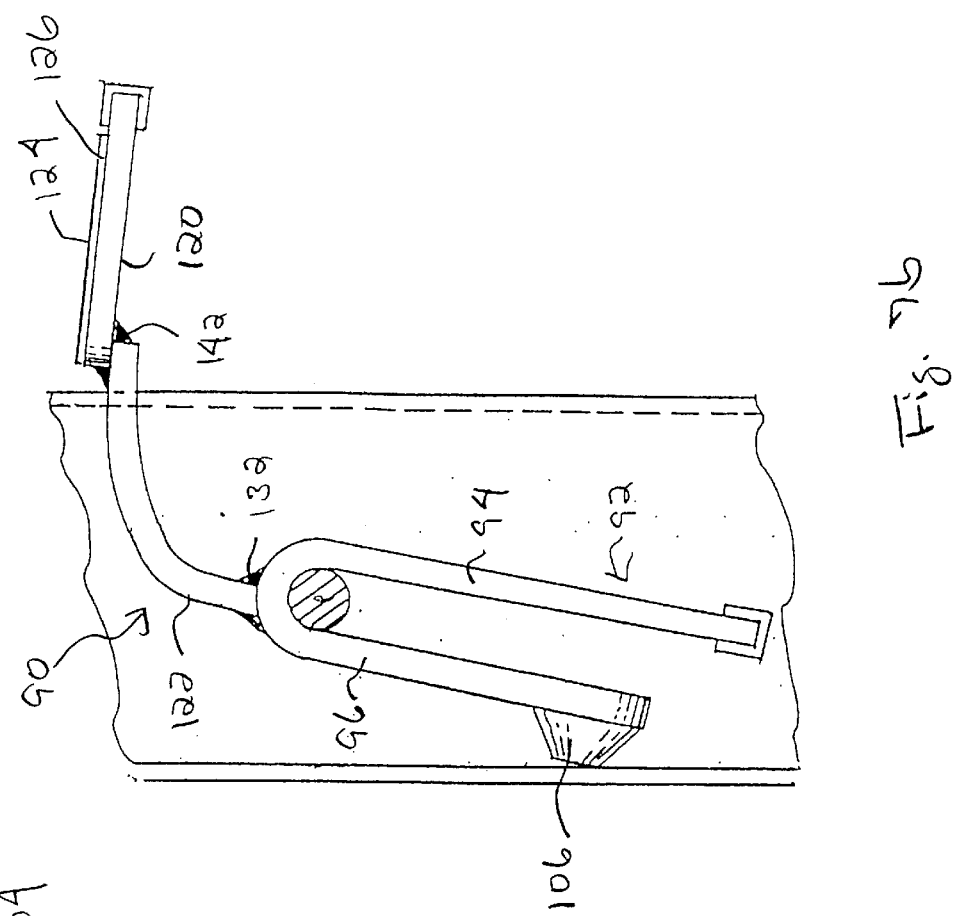
FIGS. 7a and 7b are front views of the assist device and striker stud of FIG. 5, illustrating the assist device when it is not supporting a user's weight and when it is supporting a user's weight, respectively.
Figure 7B:
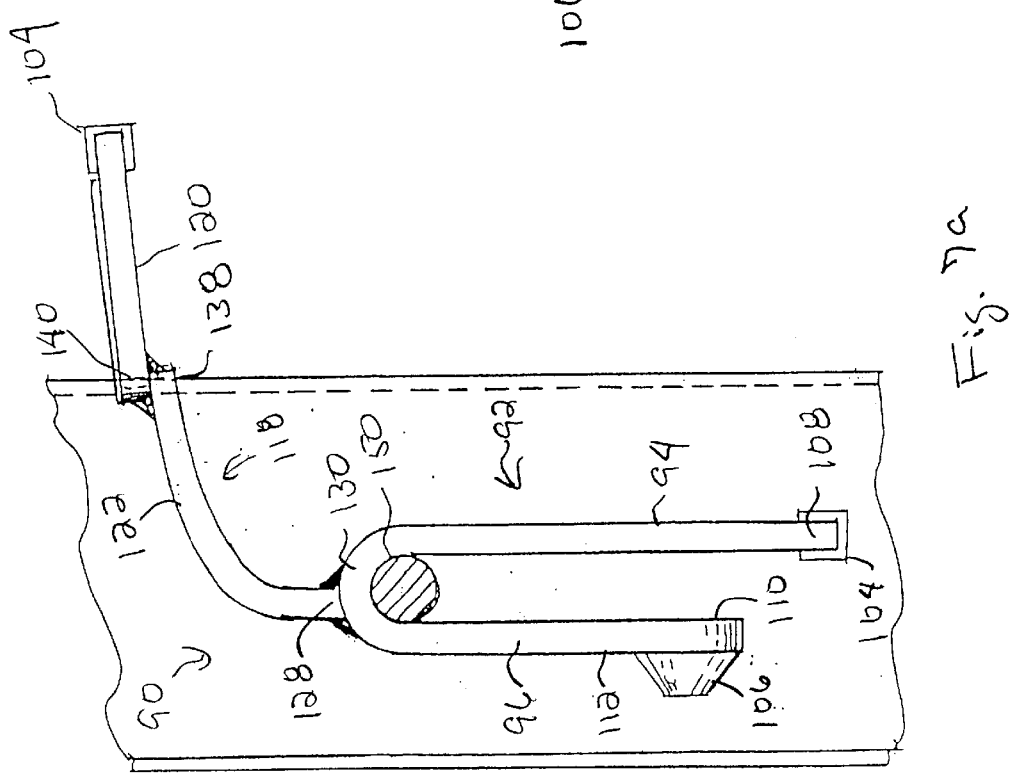
Figure 8:
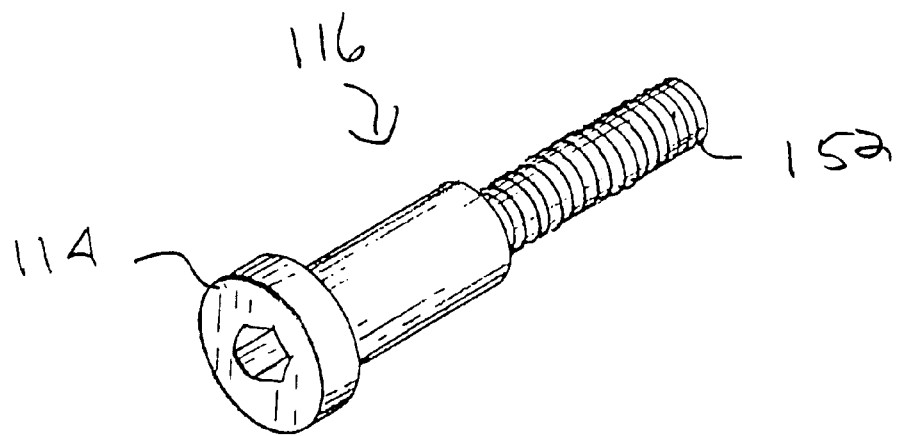
FIG. 8 is a perspective view of a shoulder bolt.
Figure 9:
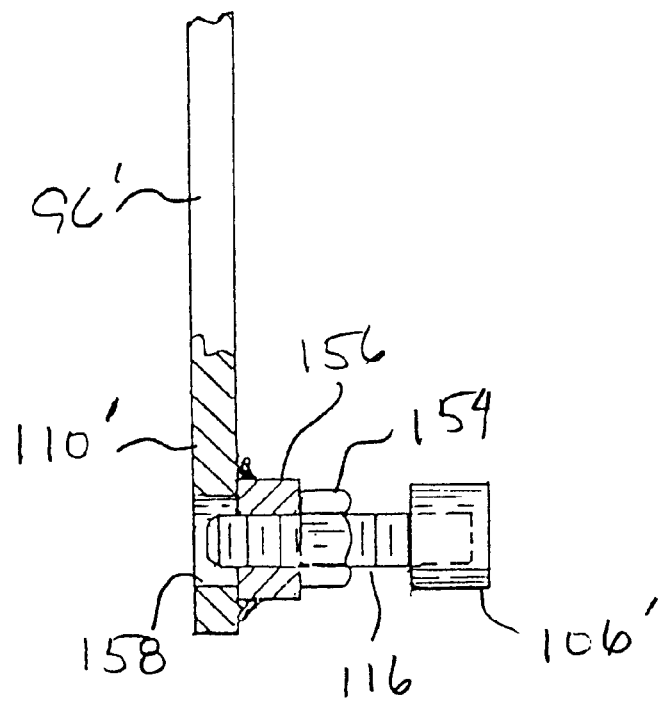
FIG. 9 is front view, partly in cross section, of the second leg of the retainer and a variant of the bumper of FIG. 5.

With reference to FIGS. 5, 7a and 7b, a second embodiment of the assist device 90 is employed in conjunction with a vehicle 10 having a stud 36 as a striker 26. The assist device 90 includes a retainer 92 having an inverted J-shape configuration. The longer, first leg 94 and the shorter, second leg 96 each have a substantially rectangular shape. The width 98 of the retainer 92 is selected such that it may be received between the head 100 of the stud 36 and any washers 102 or adjustment nut (not shown) that may be included with the striker 26, as described further below. Bumpers 104, 106 composed of rubber or similar material are mounted to the distal end portions 108, 110 of each leg 94, 96. Preferably, the bumper 104 on the first leg 94 fully encloses the distal end portion 108. The bumper 106 on the second leg 96 preferably has a conical, truncated cone, cylindrical, or round shape. In a first variant, bumper 106 is mounted to the outside surface 112 of the leg 96 (FIGS. 7a and 7b). In a second variant, bumper 106 is mounted to the head 114 of a shoulder bolt 116 (FIGS. 8 and 9).

The support member 118 has a quasi curvilinear shape and includes a support platform segment 120 and an extension segment 122. Preferably, a non-skid coating or material 124 is affixed to at least a portion of the upper surface 126 of the support platform segment 120. A first end portion 128 of the extension segment 122 is mounted to the crest of the bend portion 130 of the retainer 92, preferably by a weld 132. In a preferred embodiment, the width 134 of the extension segment 122 is substantially equal to the width 98 of the retainer 92 to ensure that the extension segment 122 does not interfere with installation of the assist device 90. The width 136 of the support platform segment 120 however, is greater than the width 134 of the extension segment 122 to provide better support to the user. As shown in FIGS. 5, 7a and 7b, the support platform segment 120 and extension segment 122 may be separate components, with the second end portion 138 of the extension segment 122 being mounted to the first end portion 140 of the support platform segment 120 (preferably by a weld 142). Alternatively, the support member 118 may be of unitary construction.

Preferably, the longitudinal length 144 of the extension segment 122 is selected such that the support platform segment 120 is disposed exteriorly of the doorframe 16. As shown in FIG. 5, this allows the centerline 146 of the support platform segment 120 to be co-planar with the centerline 148 of the extension segment 122, minimizing the probability that the application of weight to the support platform segment 120 will result in a moment arm around the centerline 148 of the extension segment. Alternatively, the centerline 146 of the support platform segment 120 may be offset from the centerline 148 of the extension segment 122 to prevent interference between the support platform segment 120 and the doorframe 16 if the longitudinal length 144 of the extension segment 122 must be reduced.

The assist device 90 is mounted in place by inserting the retainer 92 between the head 100 of the stud 36 and the side 20 of doorframe 16 (and any washers 102 or adjustment nut which may be disposed intermediate the head of the stud and the doorframe), as shown in FIG. 7a. The inner surface 150 of the crest of the bend portion 130 of the retainer 92 is configured to engage the stud 36. As the user pushes on the upper surface 126 of the support platform segment 120 to obtain support, the retainer 92 rotates about the stud 36 until the bumper 106 on the second leg 96 engages the side 20 of the doorframe 16 to stabilize the support member 118 so that an elderly person or a disabled person may use the support platform segment 120 to assist in entering or exiting the automobile 10.

For the second variant mentioned above, the threaded shaft 152 of the bolt 116 extends through a first nut 154 and is received in a second nut 156 which is mounted coaxially with an opening 158 in the distal end portion 110 of the second leg 96, preferably by a weld. Shaft 152 is adjustably positionable within the threaded opening of the second nut 156 to optimize contact between bumper 106 and a portion of the doorframe 16 to selectively position the support platform segment 120 relative to the vehicle 10 and thereby provide improved ease of use. The first nut 154 may be torqued into engagement with the second nut 156 to lock shaft 152 and maintain bumper 106 in such an optimum position.

Figure 11:
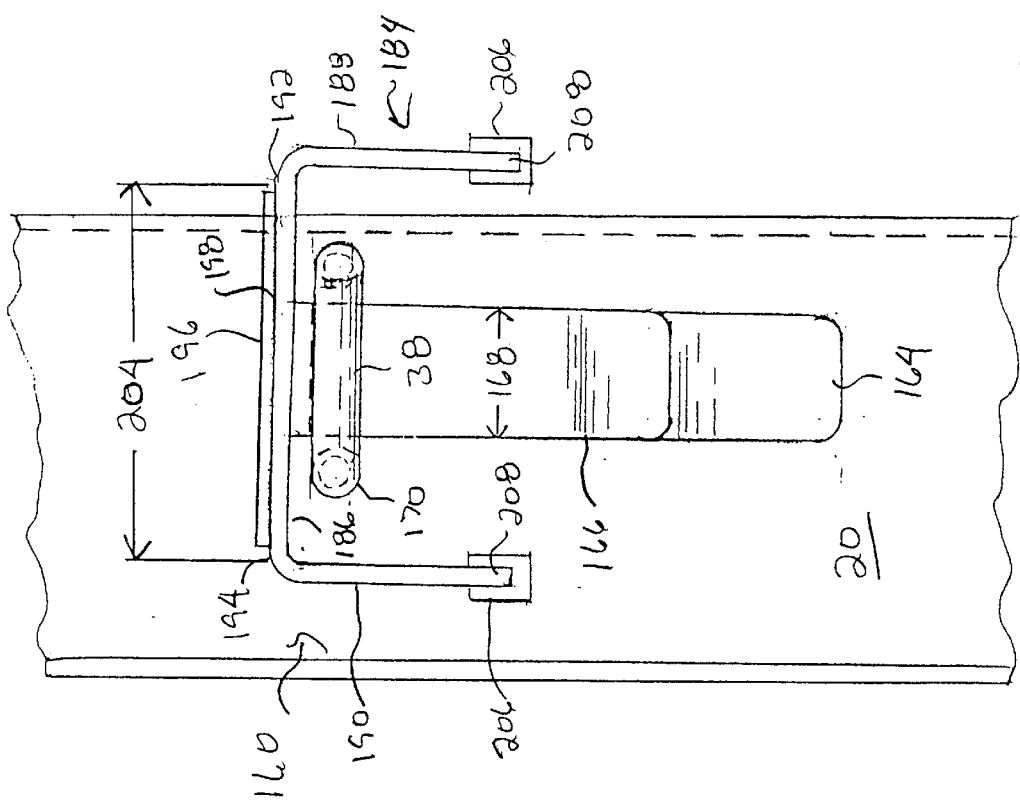
FIG. 11 is a front view of the assist device and U-shaped striker member of FIG. 10.
Figure 10:
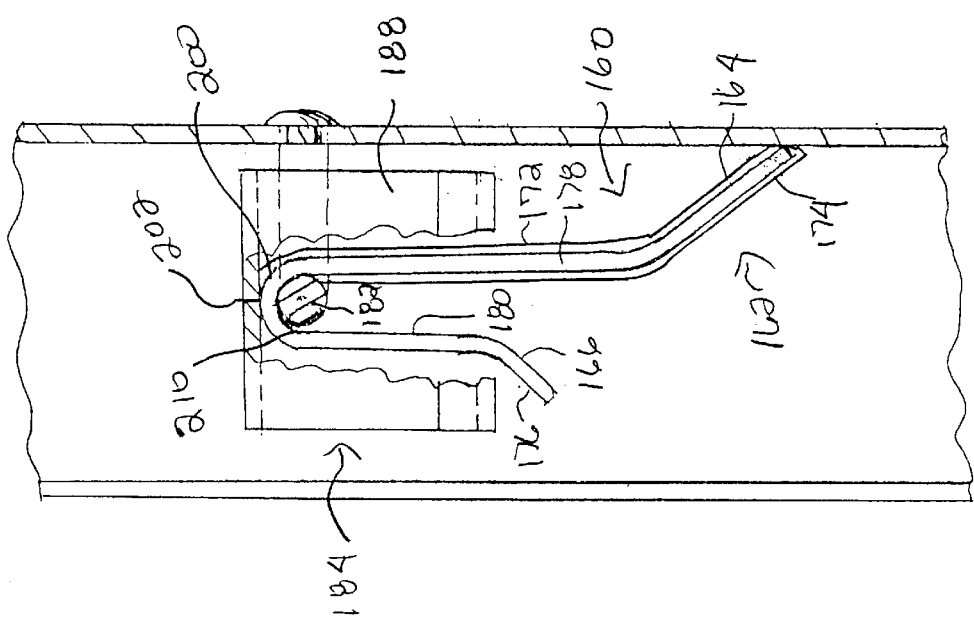
FIG. 10 is a side view, partly in phantom and partly in cross-section, of a third embodiment of an assist device in accordance with the invention mounted on a U-shaped striker member.
Figure 12:
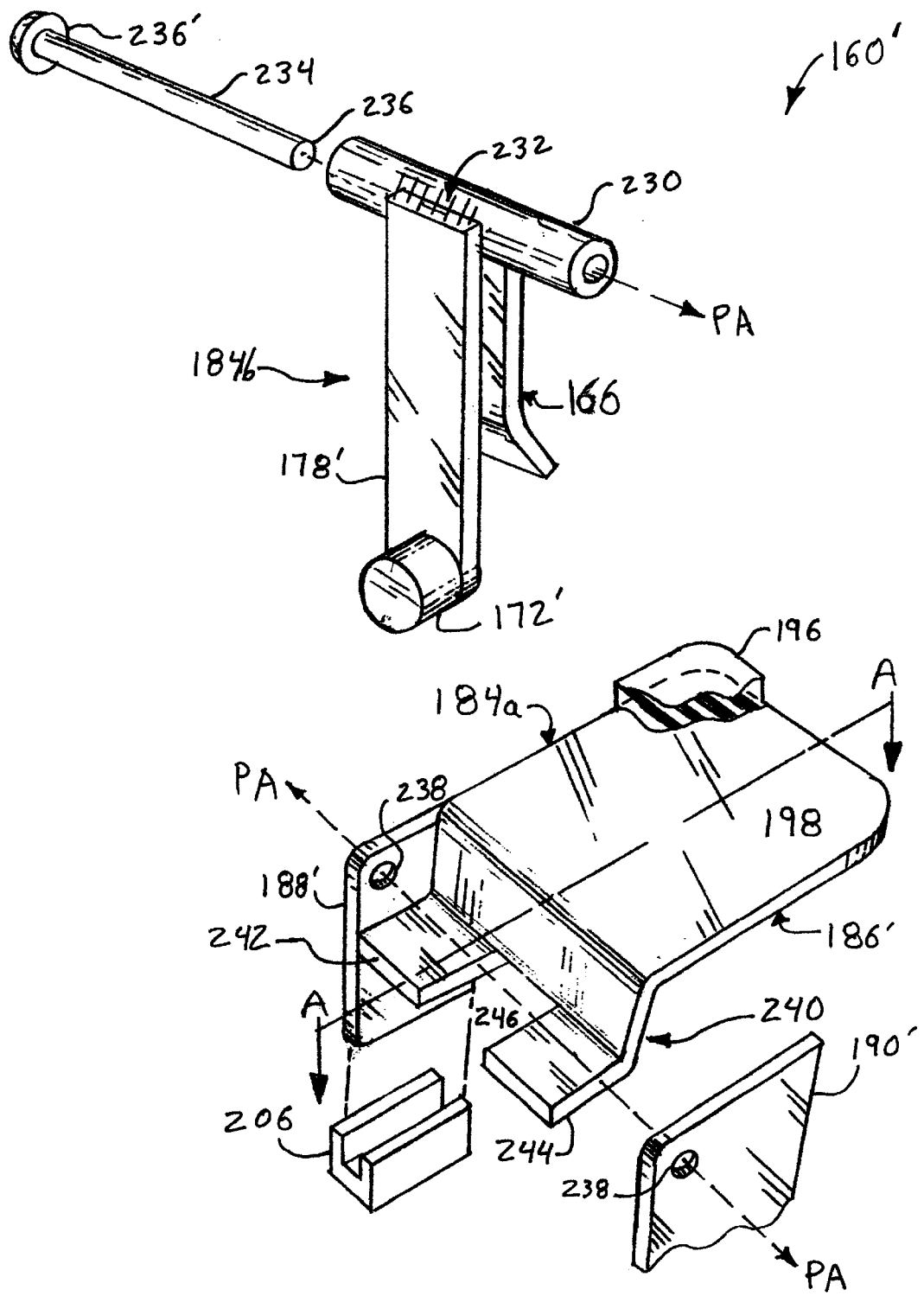
FIG. 12 is an exploded perspective view showing still another preferred embodiment of the present invention.

With reference to FIGS. 10 and 11, a third embodiment of the assist device 160 is employed in conjunction with a vehicle 10 having U-shaped striker members 38. The assist device 160 includes a quasi J-shaped retainer 162 in which the longer, first leg 164 and the shorter, second leg 166 each have a substantially rectangular shape. The width 168 of the retainer 162 is selected such that it may be received between the legs 170 of the U-shaped striker member 38, as described further below. A bumper 172 composed of rubber or similar material is mounted to, and preferably fully encloses, the first leg 164. A lower, distal end portion 174, 176 of each leg 164, 166 extends obliquely outward from the upper, main portion 178, 180 of each leg 164, 166. The distal end portion 176 of the second leg 166 is bent to facilitate insertion of the cross-bar 182 of the striker member 38 into the retainer 162 and the distal end portion 174 of the first leg 164 is bent to facilitate engagement with the doorframe 16 of the vehicle 10, as described further below.

The support member 184 includes a support platform segment 186 and first and second leg segments 188, 190 that extend orthogonally downward from the first and second ends 192, 194 of the support platform segment 186, respectively. Preferably, a non-skid coating or material 196 is affixed to at least a portion of the upper surface 198 of the support platform segment 186. The crest of the bend portion 200 of the retainer 162 is mounted along the centerline 202 of the support platform segment 186, preferably by a weld, substantially midway between the first and second ends 192, 194. The longitudinal length 204 of the support platform segment 186 is selected such that the two leg segments 188, 190 are disposed exteriorly of the Ushaped striker member 38 at a sufficient distance to ensure that there is no interference between leg segments 188, 190 and legs 170. Preferably, bumpers 206 composed of rubber or similar material wrap around the distal end portions 208 of the leg segments 188, 190.

The assist device 160 is mounted in place by inserting the first leg 164 of the retainer 162 through the opening 86 formed by the U-shaped striker 38 and the side 20 of the doorframe 16. The retainer 162 is configured to receive the cross-bar 182 of the U-shaped striker member 38 between the first and second legs 164, 166 such that cross-bar 182 wedges against the interior surface 210 of the crest of the bend portion 200 of the retainer 162 to stabilize the support member 184 so that an elderly person or a disabled person may use the support platform segment 186 to assist in entering or exiting the automobile 10. As the user pushes on the upper surface 198 of the support platform segment 186 to obtain support, the retainer 162 rotates about the cross-bar 182 until the first leg 164 engages the doorframe 16 of the vehicle 10 to provide additional support and stability. The oblique angle between the main and distal end portions 178, 174 of the first leg 164 minimizes the distance that the retainer 162 must rotate before the distal end portion 174 engages the doorframe 16, thereby maintaining the support platform segment 186 in a substantially horizontal orientation.

With primary reference to FIGS. 12 through 15 now, a fourth embodiment 160' of the inventive assist device is shown in conjunction with a vehicle 10 having striker member (preferably a U-shaped striker) 38. As shown therein, assist device 160' preferably includes a pivoting support member 184*a* and a retainer 184*b*, retainer 184*b* having a bushing 230, a longer first leg 178' and a shorter second leg 166. Each of these legs is preferably flat and rectangular in cross-section and second leg 166 includes a bend at a distal end 176. Retainer member 184*b* is adapted to be inserted between the vehicle doorframe and the U-shaped striker member 38, as described further below. A firmly resilient bumper 172', composed of rubber or similar material to reduce the possibility of damaging the vehicle doorframe, is mounted to first leg 178'. The bumper may be fixedly attached to leg 178' or it may be moveably attached to the leg (such as by a threaded screw/aperture arrangement) so that orientation of the device within the striker may be adjusted. Legs 166 and 178' are preferably welded to axis-defining bushing 230 and extend generally parallel to one another and generally perpendicular to pivot axis PA. As shown, distal end portion 176 of second leg 166 is bent to facilitate insertion of the cross-bar 182 of the U-shaped striker 38 between legs 166 and 178' as leg 178 is inserted between the doorframe and striker 38.

The pivoting support member 184*a* includes a support platform 186' and first and second guard members 188' and 190' that extend orthogonally downward from support platform 186'. Pivoting support member 184*a* also preferably includes a bifurcated clamping portion 240 comprising first and second blade-like members 242 and 244, respectively. As shown, members 242 and 244 define a gap 246 therebetween and in a clamped position (see especially FIGS. 14 and 15) second leg 166 is disposed in gap 246. Depending on a number of conditions (such as the size of cross-bar 182 and the length of members 242 and 244) first leg 178' may also be disposed within gap 246 when device 160' is in the clamped position. Also, a non-skid coating or material 196 is preferably affixed to at least a portion of the upper surface 198 of support platform 186'. The non-skid surface could, alternatively, be integrally formed with/into platform 186' by one of many ways known in the art.

Guards 188' and 190' preferably include axially aligned apertures 238 for receiving pivot shaft 234 when assist device 160' is in an assembled condition (see FIGS. 13–15). Pivot shaft 234 is preferably affixed to guards 188' and 190' by a head 236' at one end thereof and by being "pinned over" at the other end 236 as a final assembly step. Naturally, retainer member 184*b* will have been placed between the guards to permit rotation of bushing 230 about the pivot axis PA prior to "pinning over" end 236. These guard plates may help to protect the assist device and the vehicle from damage in the event that (1) an individual attempts to close the vehicle door; (2) a gust of wind blows the door closed; (3) etc., while the assist device is on the striker. Bumpers 206, composed of rubber or similar material, preferably wrap around the distal end portions 208 of guards 188' and 190' to protect both assist device 160' and the vehicle door in the event that the door closes while device 160' is engagement with striker 38. Additionally, the guard plates may prevent inadvertent tripping of the engagement mechanism of the door due if the door is closed while the device is on the striker (e.g., where the device acts as a striker that trips the door latch even though the door isn't properly closed). Thus, the guard plates help avoid a problem in which the door latch is tripped/locked even though the door was not entirely closed and in which the door latch would have to be manually reset before the door could be properly closed (after the device had been removed from the striker).

In use, support member 184*a* is rotated into the unclamped position FIG. 13 so that clamping portion 240 will not prevent insertion of device 160' into striker 38. Assist device 160' is then mounted in place by inserting first leg 178' of the retainer 184*b* through the opening formed by the U-shaped striker 38 and the side 20 of the vehicle doorframe. Retainer 184*b* preferably is configured to receive the cross-bar 182 of the U-shaped striker 38 between the first and second legs 178' and 166 such that cross-bar 182 rests on bushing 230 (FIG. 13). Then, support member 184*a* may be rotated to the clamped position of FIG. 14 so that first leg 178' is in a generally vertical position and platform 186' is in a generally horizontal position. An elderly person or a disabled person may now use the support platform 186' to assist in entering or exiting the automobile 10. As the user pushes downward on the upper surface 198 (if there is no non-skid coating—196 if there is) of support platform 186' to obtain support, pivoting support member 184*a* transfers at least a portion of the user's weight so that a clamping force is applied to the striker by clamping portion 240. This may involve slight rotation of support platform 184*a* about pivot axis PA until members 242 and 244 of clamping portion 240 apply a clamping force on striker 38. In this way assist device 160' firmly grasps striker 38 to provide stable support for the user. To remove the inventive assist device, support member 184*a* is pivoted away from the retainer (to thereby unclamp the striker) and the device is slid upwardly and out from between striker 38 and the doorframe. The presence of bumper 172' of the first leg 164 also helps to minimize the lateral movement and/or rotation of member 184*a* during this process and this adds to the perception of stability of the device. With components sized and shaped just right, platform 186' will be in a substantially horizontal orientation. This is shown in FIG. 14.

Figure 16:
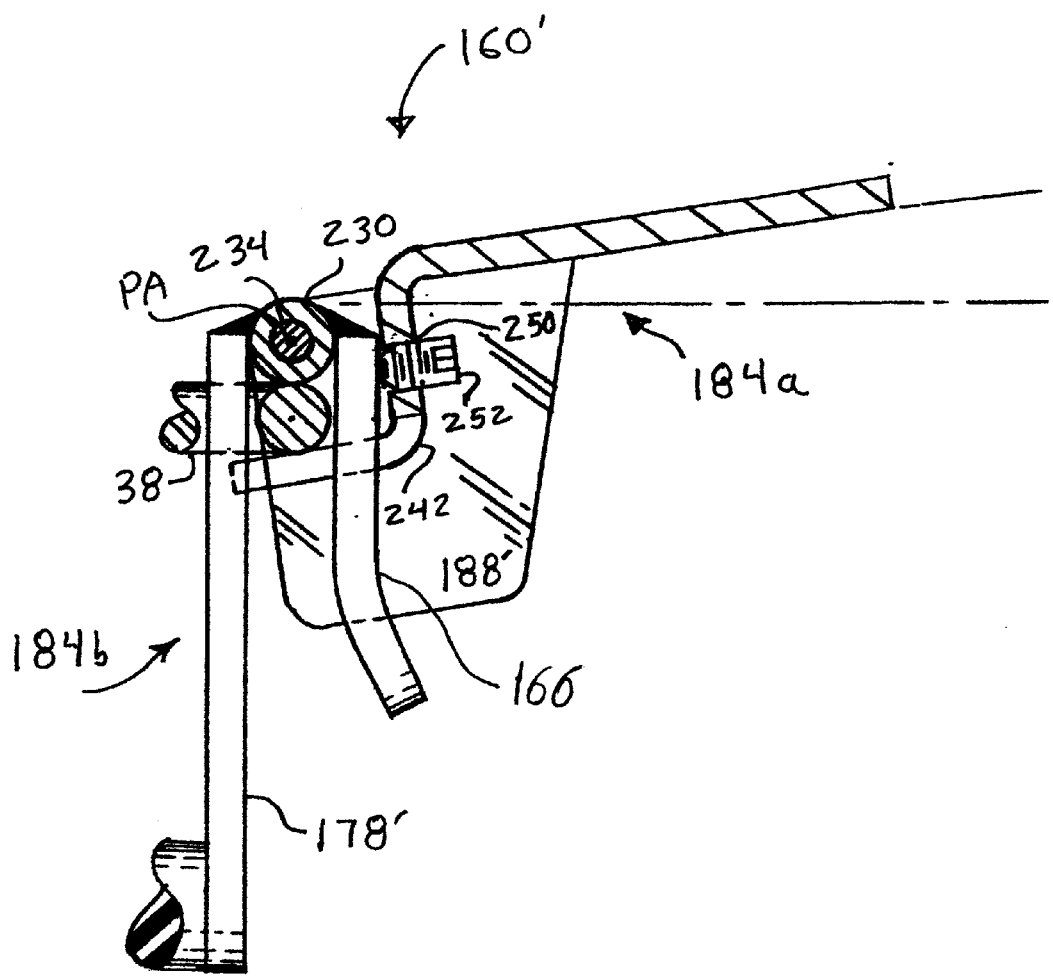
FIG. 16 is a partial cross-sectional view of a modified version of the embodiment of FIGS. 12–15, this embodiment having a position-adjustment mechanism.

Since there are a virtually unlimited number of variations vehicles, however, it is simply not possible for a single assist device to precisely fit many (or even several) vehicles without providing some degree of adjustability. That adjustability is provided by the variant assist device 160' shown in FIG. 16 through the use of a threaded set-screw 252 and a threaded aperture 250 for movably receiving the same. As shown therein, rotation of support platform 184*a* about pivot axis PA (and, hence the relative positions of retainer 184*b* and support platform 184*a*) can be limited by adjustment of set-screw 252. In still another variation of the design shown in FIG. 16, set-crew 252 and aperture 250 may be located on either or both of bifurcated clamping members 242/244 such that screw(s) 252 bear against striker 38 when device 160' is in a clamped position. These features enable assist device 160' to more properly fit a wider range of vehicle with little added expense and or difficulty.

Still another modified embodiment of the present invention is shown in FIGS. 17 through 20. As indicated by the use of the same reference numerals in these Figures, the embodiment of these Figures shares many of the structural and operational features of the embodiments discussed above. The particular clamping and adjusting portions of the support member have, however, been modified as shown therein and as discussed below. Also the embodiment is especially well adapted for use with the striker 38' (having substantially planar cross-bar 182') of FIG. 19. It will be appreciated, however, that, like the device of FIG. 16, the adjustable and clamping assist device 160" of FIGS. 17 through 20 can also be adjusted for use with many vehicles.

With continued reference to FIGS. 17 through 20, it will be seen that clamping portion 240' of support member 184*a* is not integrally formed with the remainder of the support member but, rather, is rigidly held together with an adjustable and removable fastener arrangement 254. This arrangement is preferably a pair of screws that pass through elongated slots 256 of the clamping portion 240' and into complementary threaded apertures of the support member. However, another of a wide variety of known fastener arrangements could be used instead. Those of ordinary skill will appreciate that the fastener arrangement shown permits adjustment of the radial distance from the pivot axis PA to the clamping members 242' and 244' and, thereby, permits adjustment of the support platform as desired.

Another important feature of this embodiment is the clamping action of the clamping members 242', 244' and the striker. As shown, this embodiment differs from the others in that the clamping members have curved distal ends that provide clearance between the clamping portion 240 and cross-bar 182' so that clamping is achieved by engagement between the ends of the clamping members and the other portions of the striker (see FIG. 19). Aside from these differences this embodiment is structurally and operationally similar to those discussed above. Still another important feature of the invention is symmetry. Symmetry permits the use of a single assist device as either a passenger-side assist device or a driver-side assist device simply by applying the device to the appropriate side of the vehicle.

It will be appreciated that assist devices 40, 160, 160' and 160" have been designed to position the support platform segment 46, 186 close to the doorframe 16 of the vehicle 10 to prevent deflection of the doorframe 16 which could cause an alignment problem between the door latch 28 and the striker 26. All of the assist devices 40, 90, 160, 160' and 160" are designed to be used with doorways on either side of a vehicle 10. It should be appreciated that the size of the support platform segment 46, 186 may be increased to facilitate use and to provide greater support to the user. However, the retainer 42, 162 of devices 40 and 160 must be mounted to one side of such an enlarged support platform segment 46, 186, if the support platform segment 46, 186 is to be positioned close to the doorframe 16. Consequently, such an assist device will be useable on only one side of a vehicle 10.

It should be appreciated that each of the assist devices 40, 90, 160, 160' and 160" described above functions to provide an easily mountable and removable support which attaches to the doorframe 16 of a vehicle 10 and provides a stable support platform 46, 120, 186, 186' for allowing a disabled or elderly person to exit from a vehicle 10. It should also be appreciated that if the door 14 is accidentally closed while a device 40, 90, 160, 160' and 160" is installed, the relatively soft material of the bumpers 78, 104, 106, 206 will prevent or limit damage to the door and doorframe, depending on the force of impact. That is bumper 78 on the free end 80 of engagement segment 76 will contact the door and bumper 78 on the first end 56 of support platform segment 56 will contact the doorframe for the first device 40; bumper 104 on support platform 120 will contact the door and bumper 106 on the second leg 96 of retainer 92 will contact the doorframe for the second device 90; and bumpers 206 on leg segments 188, 188' and 190, 190' will contact the door and doorframe, respectively, for devices 160, 160' and 160".

While the present invention has been described in connection with what is presently considered to be the most practical and preferred embodiments, it is to be understood that the invention is not limited to the disclosed embodiments, but is intended to encompass the various modifications and equivalent arrangements within the spirit and scope of the appended claims. With respect to the above description, for example, it is to be realized that the optimum dimensional relationships for the parts of the invention, including variations in size, materials, shape, form, function and manner of operation, assembly and use, are deemed readily apparent to one skilled in the art, and all equivalent relationships to those illustrated in the drawings and described in the specification are intended to be encompassed by the appended claims. Thus, the foregoing is considered an illustrative, not exhaustive, description of the present invention.

What is claimed is:

1. An assist device providing a stable support for entering and exiting a vehicle through a vehicle doorframe having a striker mounted on a side portion of the doorframe, the striker being adapted to engage a door latch to thereby secure the door to the doorframe in a closed position and having a cross-bar, the assist device comprising:
    a rigid retainer being adapted to removably engage the striker and defining a pivot axis that is at least generally parallel to the side portion of the doorframe; and
    a rigid support member with a clamping portion and a support platform for supporting at least a portion of a user's weight, the support member being pivotably mounted to the retainer for rotation about the pivot axis whereby the clamping portion applies a clamping force to the striker when the user's weight is supported by the support member.

2. The assist device of claim 1, wherein the striker is U-shaped and the retainer is adapted for insertion through an opening formed between the side portion of the doorframe the U-shaped striker.

3. The assist device of claim 2, wherein the retainer comprises an axial bushing and first and second legs extending from the bushing generally perpendicular to the retainer axis, the first and second legs being spaced from one another whereby the first leg may be inserted through the opening formed between the doorframe and the U-shaped striker.

4. The assist device of claim 3, wherein the first leg further comprises an adjustable resilient bumper that may bear against the side of the doorframe when the retainer member is inserted into the striker.

5. The assist device of claim 3, wherein
    the clamping portion of the support member comprises a bifurcated clamp with first and second members defining a gap therebetween; and
    the second leg of the retaining member is disposed within the gap when the support member is in the clamped position.

6. The assist device of claim 3, wherein
    the clamping portion of the support member comprises a bifurcated clamp with first and second members defining a gap therebetween;
    the second leg of the retaining member is disposed within the gap when the support member is in the clamped position; and
    each of the first and second members comprise a generally blade-like member with a curved distal end that clamps onto the striker when the user's weight is supported by the support member.

7. The assist device of claim 2, wherein the retainer comprises an axial bushing and rigid first and second legs extending from the bushing generally perpendicular to the retainer axis, the first leg further comprising a resilient bumper that bears against the doorframe when the retainer member is inserted into the striker.

8. The assist device of claim 1, wherein
    the support platform may rotate about the retainer axis between clamped and unclamped positions; and
    the support platform further comprises an adjustment member movably mounted thereto such that rotation to the clamped position may be adjustably limited by movement of the adjustment member.

9. The assist device of claim 1, wherein the support platform has oppositely disposed first and second guards disposed on respective opposite sides of the clamping portion of the support member to thereby prevent the door latch from tripping while the retaining member is inserted between the doorframe and the striker.

10. The assist device of claim 1, further comprising means for preventing the door latch from tripping while the device is in an operative position in the doorframe.

11. The assist device of claim 1, wherein
    the support platform may rotate about the retainer axis between clamped and unclamped positions;
    the support platform further comprises an adjustment member movably mounted thereto such that rotation to the clamped position may be adjustably limited by movement of the adjustment member; and
    the adjustment member comprises a bifurcated clamping portion adjustably affixed to the support member.

12. The assist device of claim 1, wherein
    the support platform may rotate about the retainer axis between clamped and unclamped positions;
    the support platform further comprises an adjustment member movably mounted thereto such that rotation to the clamped position may be adjustably limited by movement of the adjustment member; and
    the adjustment member comprises a set-screw threadedly affixed to the support member.

13. An assist device providing a stable support for entering and exiting a vehicle through a vehicle doorframe having a striker mounted on a side portion of the doorframe, the striker being adapted to engage a door latch to thereby secure the door to the doorframe in a closed position, the assist device comprising:
    means for removably engaging the striker; and
    means for supporting at least a portion of a user's weight upon either entry into or exit from the vehicle, the means for supporting being pivotable relative to the means for engaging whereby a clamping force is applied to the striker when the user's weight is supported by the means for supporting.

14. The assist device of claim 13, wherein
    the means for supporting may rotate between clamped and unclamped positions; and
    the means for supporting further comprises means for adjustably limiting rotation of the means for supporting.

15. The assist device of claim 13, wherein the means for supporting further comprises means for preventing the door latch from tripping when the device is operatively engaged with the striker.

16. The assist device of claim 13, wherein the means for supporting further comprises a substantially planar supporting platform and means for adjusting the position of the supporting platform relative to the means for retaining.

17. A method of providing support for entering and exiting a vehicle through a vehicle doorframe having a striker mounted on a side portion of the doorframe, the striker being adapted to engage a door latch to thereby secure the door to the doorframe in a closed position, the method comprising:

placing at least a portion of a retainer member between the doorframe the striker to thereby define a pivot axis that is generally parallel to the side portion of the doorframe; and rotating a support member, that is pivotably attached to the retainer member, about the pivot axis until the support member engages the striker whereby a clamping force will be applied to the striker.

18. The method of claim 17, further comprising a step for adjusting the position of the support member relative to the retainer member.

19. The method of claim 17, wherein the vehicle has substantially identical driver-side and passenger-side doorframes with strikers mounted thereto;

the step of placing comprises placing at least a portion of the retainer member between the driver-side doorframe and the driver-side striker;

the step of rotating a support member, comprises rotating the support member relative to the retainer member until the support member engages the driver-side striker whereby a clamping force will be applied to the driver-side striker when the user's weight is supported by the support member;

the method further comprises removing the retainer member from between the driver-side doorframe and the driver-side striker; and placing at least a portion of the retainer member between the passenger-side doorframe and the passenger-side striker.

20. The method of claim 19, further comprising rotating the support member relative to the retainer until the support-member engages the passenger-side striker whereby a clamping force will be applied to the passenger-side striker when the support member supports the user's weight.

* * * * *